Sept. 24, 1957 E. J. RABENDA 2,807,413

ELECTRONIC DECIMAL STORAGE DEVICE

Filed June 14, 1954 6 Sheets-Sheet 1

INVENTOR.
EDWARD J. RABENDA
BY William V. Schelberg
AGENT

ELECTRONIC DECIMAL STORAGE DEVICE

Filed June 14, 1954 6 Sheets-Sheet 2

INVENTOR.
EDWARD J. RABENDA
BY William V. Schilberg
AGENT

INVENTOR.
EDWARD J. RABENDA
BY William V. Schelberg
AGENT

ELECTRONIC DECIMAL STORAGE DEVICE

INVENTOR.
EDWARD J. RABENDA
BY William V. Schelberg
AGENT

ELECTRONIC DECIMAL STORAGE DEVICE

Filed June 14, 1954 6 Sheets-Sheet 5

INVENTOR.
EDWARD J. RABENDA
BY William V. Schelberg
AGENT

INVENTOR.
EDWARD J. RABENDA
BY William V. Schellberg
AGENT

United States Patent Office 2,807,413 Patented Sept. 24, 1957

2,807,413

ELECTRONIC DECIMAL STORAGE DEVICE

Edward J. Rabenda, Poughkeepsie, N. Y., assignor to International Business Machines Corporation, New York, N. Y., a corporation of New York Application June 14, 1954, Serial No. 436,497

9 Claims. (Cl. 235—61.6)

The present invention relates to information handling systems wherein data representing electrical impulses are stored and subsequently delivered to recording or accumulating apparatus.

The principal object of the invention is to provide an improved storage system capable of accepting data as a true or complement value and likewise capable of selectively reproducing the stored data in either form.

In carrying out the invention, storage is accomplished by means of glow transfer counter tubes with plural groups of denominationally ordered tubes provided, to and from which the data may be selectively directed. Each counter tube operates in decimal fashion and is equipped with digit representing cathodes along which a single glow discharge is successively stepped in response to the application of electrical impulses. A series of ten drive pulses are directed to the tube and advances the glow from a datum cathode until a differentially timed control impulse, representative of the value to be stored, locks the discharge at the position attained so that subsequent ones of that group of ten drive pulses are ineffective to cause a further advance of the glow position.

Accordingly, another object of the invention is to provide a storage system wherein one of a plurality of decimal storage devices is selectively controlled through a common control tube associated with each denominational order of the several groups.

A more specific object is to provide a decimal storage system wherein a single control tube is employed to selectively control the flow of data into or out of storage either as a true value or as a complement of nine.

Other objects of the invention will be pointed out in the following description and claims and illustrated in the accompanying drawings, which disclose, by way of example, the principle of the invention and the best mode which has been contemplated of applying that principle.

In the drawings:

Figures 1, 2, 3, 4 and 5 taken together and arranged in the order indicated in Figure 8 constitute a wiring diagram of the circuits in the apparatus.

Figure 8:
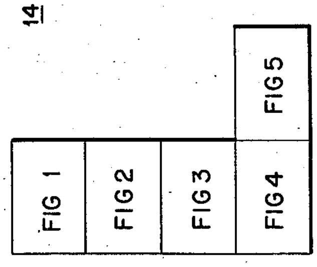

Figure 8 diagrammatically represents the manner in which the figures comprising the circuit diagram are to be arranged to constitute a complete circuit.

Figures 5, 9:
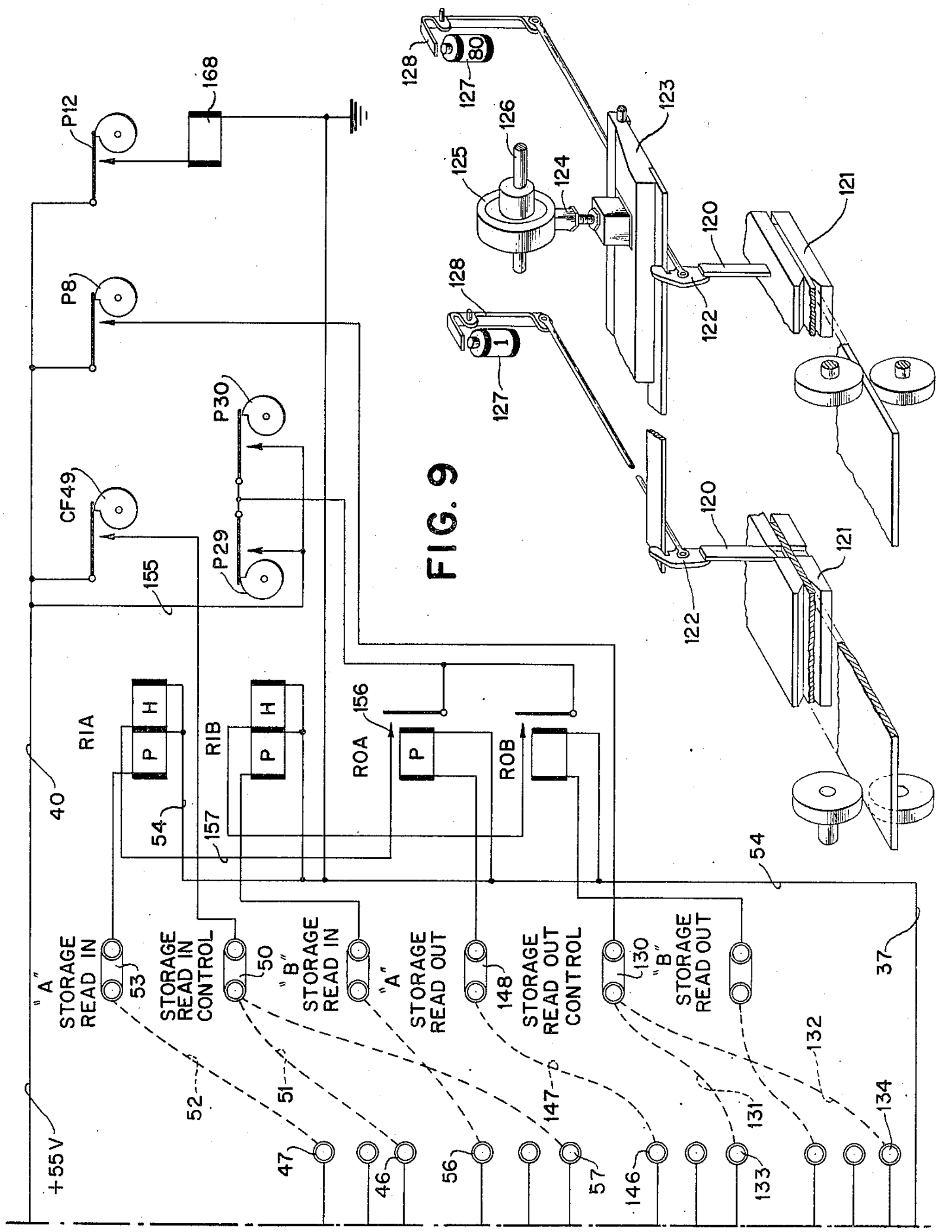

Figure 9 is a schematic illustration of a device used as a recorder mechanism.

Figure 1:
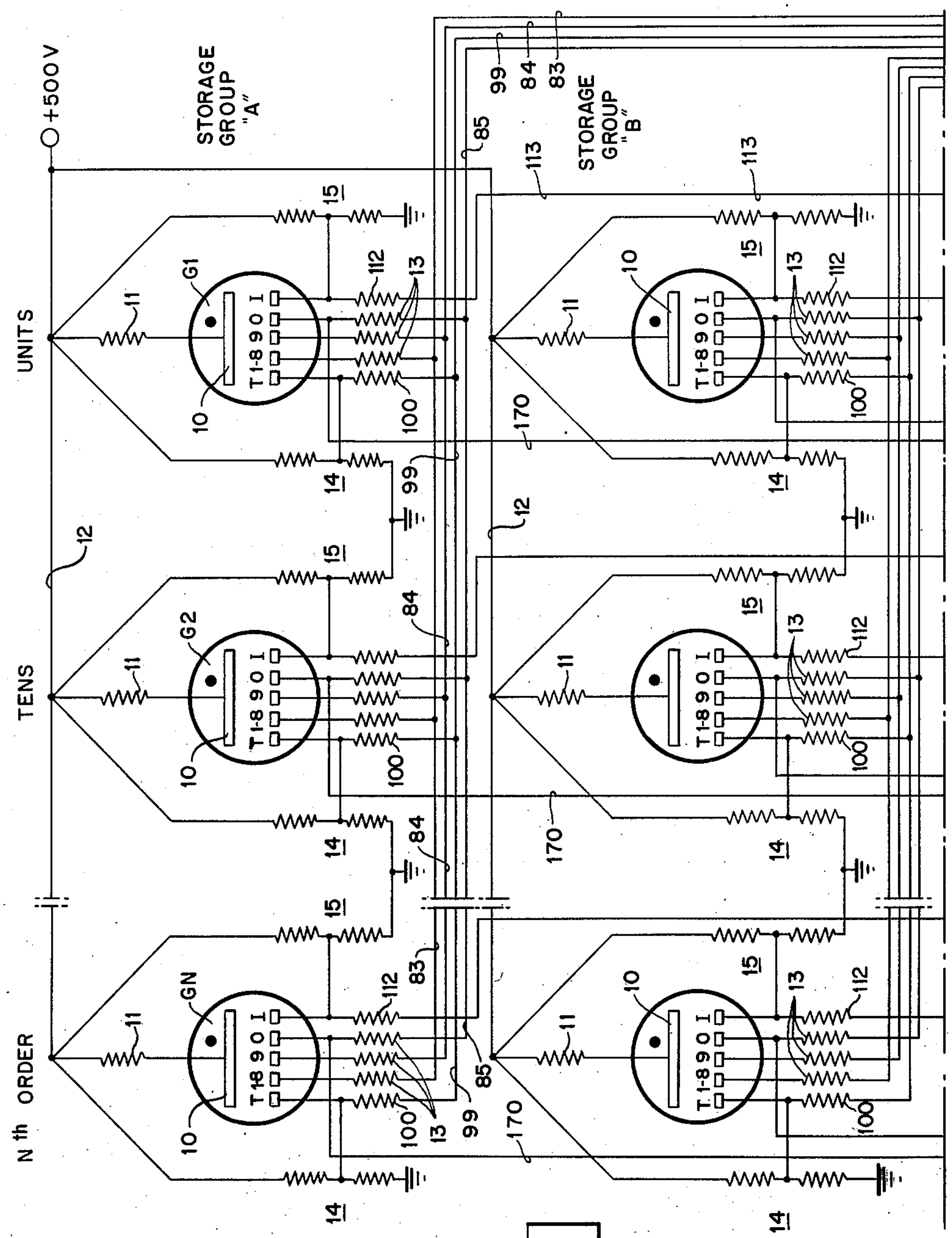

Referring now to Figure 1 of the drawings, two storage groups designated A and B are illustrated, with each group comprising a plurality of storage tubes G, one for each denominational order of a multidigit character to be stored. Only two groups are shown, however, it is to be understood that any number may be provided and likewise any number of orders within the several groups may be used as the capacity of the system dictates.

Each of the glow transfer decimal counter tubes G is of the type disclosed and claimed in copending United States patent application Serial No. 301,675, filed July 30, 1952, and need only be briefly described here for an understanding of the invention. Ten digit representing cathodes labeled 0–9 and a like number of interspersed transfer cathodes T are arranged in a closed glow transfer path, with a single anode 10, spaced equidistantly from each of the cathodes. The digit cathodes are arranged so that ones representing complementary values are adjacent one another and inversion cathodes I are arranged thereby between for bidirectional glow transfer. The digit cathodes representing values 1 through 8 are commonly connected, while the transfer cathodes T as well as the inversion cathodes I are likewise commonly connected and illustrated as a single element in the drawing to avoid duplication of circuitry. The "9" and "0" digit cathodes are provided with individual circuits and are shown as separate elements as will be noted hereafter. The anodes 10 of the tubes G in each group are connected through individual resistors 11 to a conductor 12, energized at +500 volts by a source not shown. The digit cathodes 0–9 are connected through individual resistors 13 to a less positive source of potential through circuitry to be later described, the transfer cathodes T are biased to a less positive potential through a resistor divider network 14, connected between the line 12 and ground, and the inversion cathodes I are similarly connected through another resistor divider 15 coupled to the line 12 and to ground. Circuits are provided as will be described hereafter, for each of the T and I cathode circuits to which pulses are applied in causing the tubes to function. For purposes of explanation, it is assumed that a stable glow discharge persists between the "0" digit cathode and the anode 10. A negative pulse applied to the transfer cathode circuit causes the voltage difference between the cathodes T and anode to become greater than that between any one of the digit cathodes and the anode. The transfer cathodes adjacent the "0" digit cathode are in a region of more intense ionization and the discharge transfers to one of them as determined by a preference mechanism which allows the shift to take place in only one direction. When the pulse terminates, the voltage difference between the digit cathodes and the anode becomes greater and the discharge transfers to the "1" digit cathode, being in the preferential direction. Application of further pulses similarly causes a progressive transfer of the glow to a succeeding higher value representing digit cathode. The inversion cathodes I are commonly connected as mentioned above and are pulsed simultaneously, like the T cathode, but to cause a self-complementing action. Assuming the initial glow discharge to be from the anode to the "0" digit cathode and recalling that complement representing digit cathodes are adjacent one another with an I cathode intermediate them, a negative pulse applied to the I cathode circuit causes the glow to prefer the adjacent I cathode rather than the "0" digit cathode. When this pulse is relaxed, the glow prefers a digit cathode and, due to the preference device provided, transfers to the "9" cathode. A further I cathode is provided between complement representing digit cathodes having a preference direction in a reverse sense so that a second negative pulse applied on the I cathode circuit causes a recomplementing action and, for the example taken, the glow transfers from the "9" cathode back to the "0" cathode.

Figure 4:
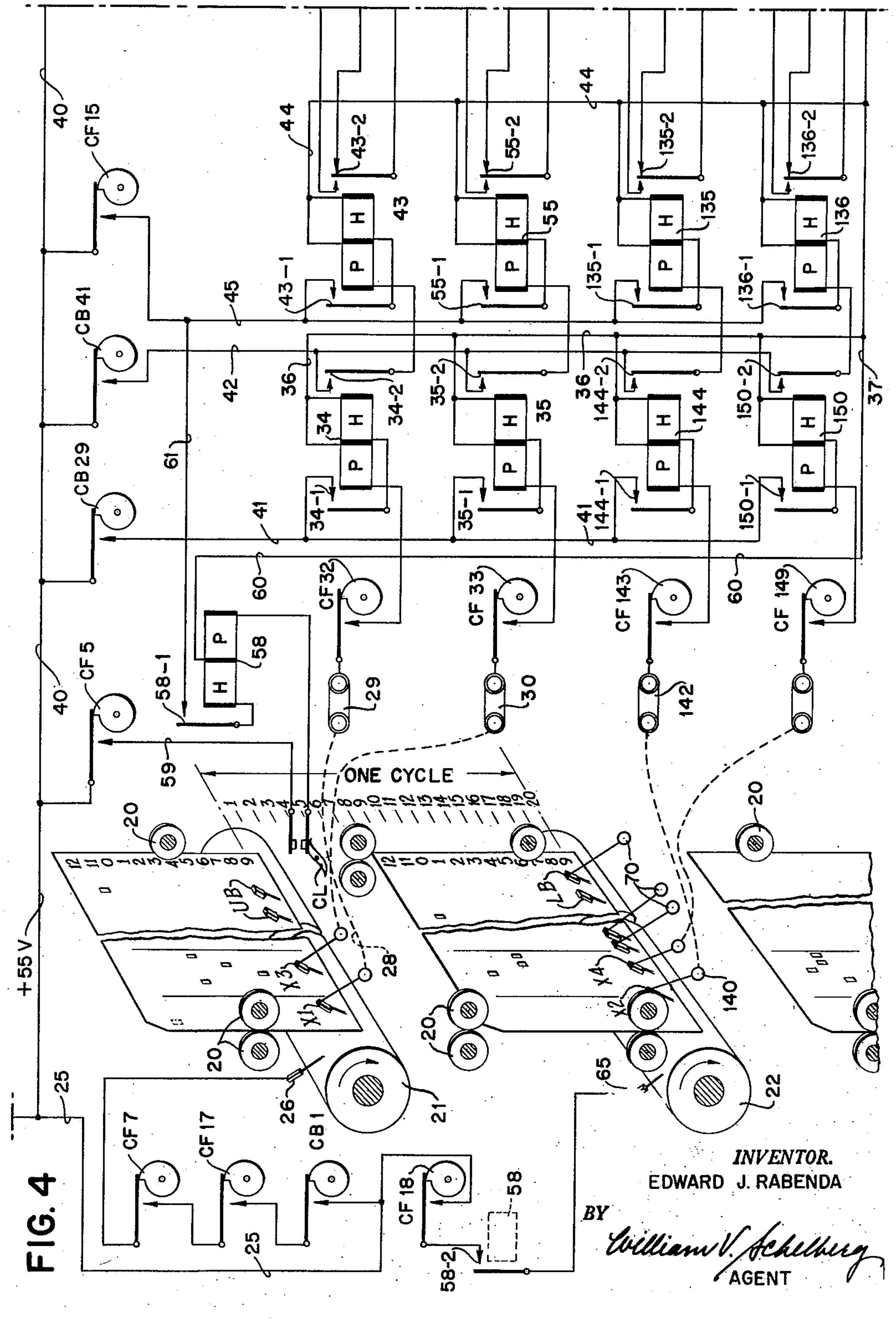

Another basic component of the system to be described is the card sensing mechanism shown schematically in Figure 4. Here record cards of the well-known type, having a plurality of vertical columns with the usual ten digit representing perforation positions 0 to 9 and two control positions designated 11 and 12, are illustrated. The cards are fed successively from a supply hopper (not shown) to a set of feed rollers 20, which convey the cards past a row of upper sensing brushes designated UB and then past a row of lower sensing brushes LB. The brushes make contact through the usual perforations with contact rollers 21 and 22 and are spaced apart so that they concurrently sense the same index positions of successive cards with the distance between the two rows of brushes representative of a complete card cycle.

Figure 6:
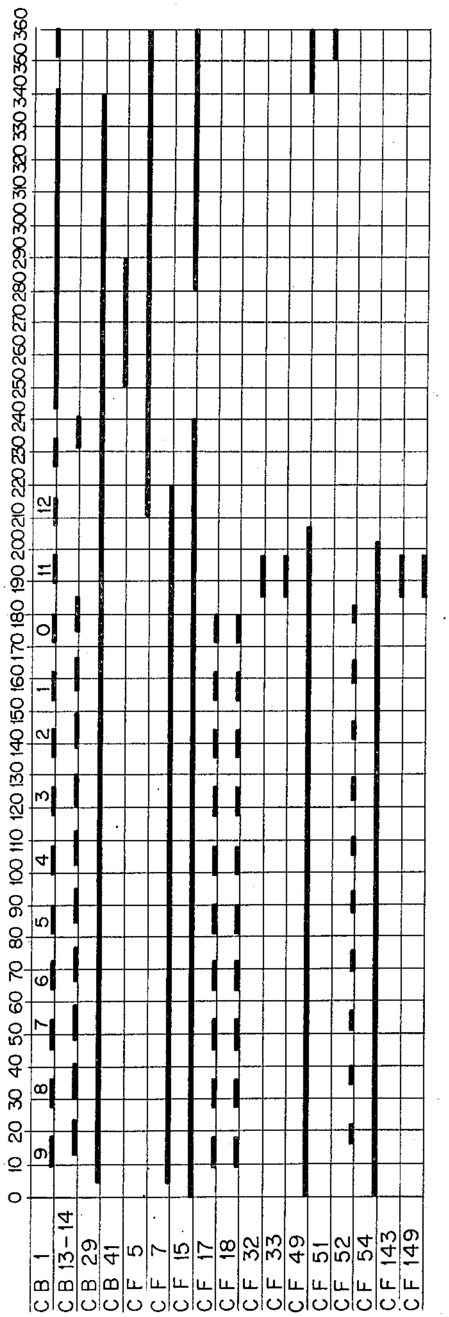
Figure 6 represents a timing diagram for the cam controlled circuit making devices of the card reading unit.

Driven with the feed rollers 20 are a number of cam operated contacts whose timing is shown in Fig. 6. These contacts are prefixed CF and CB, and the heavy lines in the diagram represent the period in a card feed cycle when the contacts are closed with a complete cycle represented as 360°.

Each record card has a field constituting a plurality of columns in which perforations representing an amount are made, and a control field by which perforations in the 11 position in selected columns indicate the storage group into which the amount is to be entered. These control perforations are sensed by the brushes at the upper reading station designated X1 and X3, and at the lower reading station by brushes X2 and X4 with the two storage groups A and B illustrated. Other column positions and more or fewer control columns may be required depending upon the number of storage groups provided.

A perforation in column 1 at the 11 position is used to direct storage of the amount represented in other columns of the card into the group A storage tubes G, while a perforation in column 3 at the 11 position directs the amount to storage group B. With the passage of a record card through the upper reading station a perforation in column 1, for example, is sensed by the X1 brush, completing a circuit from a line 25, maintained at +55 volts by a source not shown, through cam contacts CB1, CF17, CF7, a common brush 26 held in contact with the roller 21, through the card perforation, the X1 brush, a plug wire 28 and the hub 29. A perforation in column 3 indicating that the B storage group is to be used, would be sensed by the X3 brush to energize a hub 30 in a similar manner. Closure periods of the CF and CB contacts are shown in Figure 6, as before mentioned, and CF32 and CF33 are also closed during this interval connecting the hubs 29 and 30 to the pick coil of group selector relays 34 and 35 respectively.

Considering the A storage group to have been selected and hub 29 held at +55 volts, a circuit is completed through the pick coil of relay 34 to a lead 36 which is connected to a grounded bus 37. Contacts 34–1 now close to complete a circuit from a line 40, also coupled to the +55 volt source (not shown), through cam contact CB29 and a lead 41 to the hold coil of the relay 34. Contacts 34–2 are closed and are now held closed until 340° in the card feed cycle when the CB29 contacts open. Before this period, a further cam contact CB41 closes at 250° completing a circuit from the line 40 through its contacts, a lead 42 and the contacts 34–2 to the pick up coil of a transfer relay 43, a line 44, and to the grounded bus 37. Before CB41 opens its contacts at 290°, a further cam contact CF15 closes at 280° and completes a circuit from the line 40, the CF15 contacts, a lead 45, contact 43–1 and the hold coil of relay 43 to lead 44. This holds the normally open contacts 43–2 closed so that a circuit is completed between a pair of hubs 46 and 47. This circuit maintains the hold coil of relay 43 energized until 240° of the next cycle and consequently allows control of the amount read from the same card at the lower reading station for entry in the A storage group. This function is initiated by closure of contacts CF49, energizing a storage read in control hub 50 from the line 40 and through a plug wire 51 to the hub 46, contacts 43–2, the hub 47, a plug wire 52, "A" storage read in hub 53, a read in pick up coil RIA and through a lead 54 to the grounded bus 37.

The passage of a card through the first reading station with a perforation in the control position in column 3 would set up the same basic circuits as that described in detail for column 1, with the relay 35 and a transfer relay 55 energized in like manner to provide a circuit between a pair of B group storage read in hubs 56 and 57 for the purpose of energizing a read in relay RIB and reading into the B group of storage tubes.

In passing the second reading station, the LB brushes sense the amount to be stored through contacts made through the card perforation in columns 5–80. During this second card feed cycle, closure of a set of contacts designated CF5 energizes the pick up coil of a relay 58 through a lead 59, card lever contact CL and a grounded lead 60. This closes contacts 58–1 completing a circuit for the hold coil of relay 58 through the aforementioned cam contacts CF15 and a lead 61. Contacts 58–2 are also closed to energize the contact roller 22 through a brush 65 and a cam contact CF18, which connect with the +55 volt line 25.

In the description to follow, entry of an amount into the A storage group will be considered with the read in relay RIA energized as explained above during a first card feed cycle. As the card passes through the lower reading station during the second or following feed cycle, the amounts are sensed by the lower brushes LB. Each of these brushes is provided with an individual circuit terminal 70 to which plug wire connections are made to appropriate storage entry hubs 71, shown in Fig. 2 and corresponding with the proper denominational order of the sensed data. At 340° in the first card feed cycle, the cam contact CF49 (Fig. 5) closes and a circuit is completed from the line 40 to the storage read in control hub 50, plug wire 51, to the A group storage read in hub 46, the now closed transfer contacts 43–2 to hub 47, plug wire 52, hub 53, the pick up coil of the read in relay RIA and line 54 to the grounded lead 37.

Energization of the RIA relay from 340° to 207° in the second cycle keeps the normally open contact points 75 (Fig. 2) closed during the interval that the card is sensed by the lower brushes LB and completes a circuit between the anode of a thyratron control tube K and the I cathode of the associated A group glow transfer storage tube G.

Figure 3:
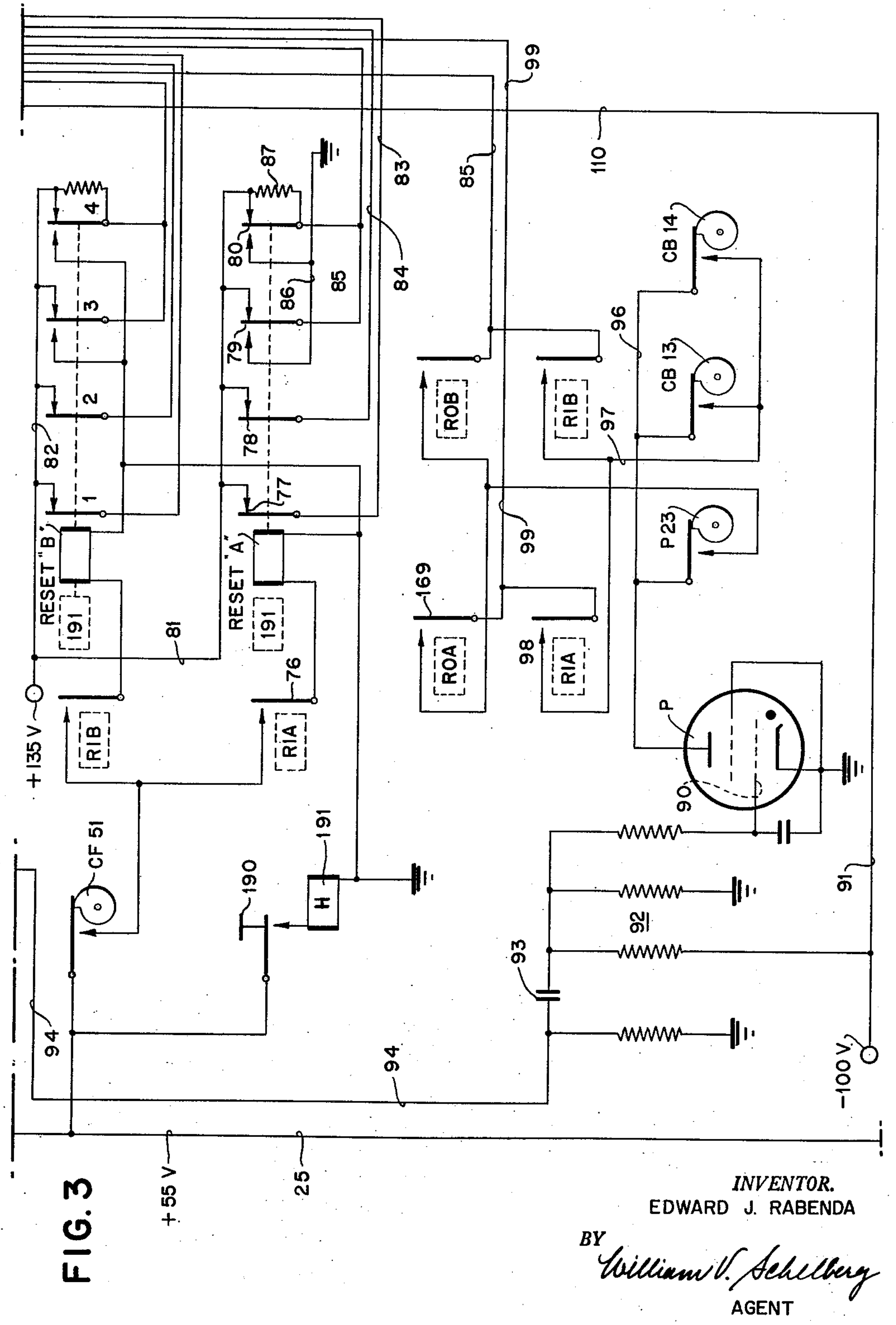

Before entry of data into the storage tubes, however, it is necessary to establish the glow discharge in each tube G at the "0" digit representing cathode, in order to reset the storage group to zero. Energization of the RIA relay also closes a set of contacts 76 (Fig. 3) and when a set of cam contacts CF51 close from 350° to 360°, as seen from the timing chart, a reset "A" relay is energized operating its contacts 77 to 80. The normally closed points of each of these contacts is connected to a lead 81 which is held at +135 volts by connection to a bus 82 that is energized by a source not shown. The transfer point of contact 77 is conected through a lead 83 and resistor 13 to the digit cathodes "1–8" of each of the storage tubes G comprising the A group and the transfer point of contact 78 is connected through a lead 84 and resistor 13 to the "9" digit cathode of each group A storage tube. The common point of contact 79 is connected to a lead 85, coupled with the "0" digit cathode of the group A storage tubes and is provided with a normally open contact connected to a grounded lead 86. Contact 80 is connected in parallel with contact 79 and is provided with a resistor 87 shunting the normally closed and common points. This resistor insures a continuous circuit to the "0" digit cathodes while the reset common point is transferring from the normally closed to the normally open contact point.

As the reset "A" relay is energized, the normally closed points of the contacts 77 and 78 open, removing the +135 volts potential from all the digit cathodes of the A group storage tubes and at the same time contacts 79 and 80 connect the "0" digit cathodes to ground forcing the glow discharge to be established on the "0" cathodes.

Up to this point the read in relay RIA has been energized and the A group of storage tubes have been reset to the "0" digit. The next sequence of operations to be considered is the application of drive pulses to the tubes G to cause the glow now established to advance potentially ten times for each card read in function. For this purpose a transfer pulse control thyratron designated P is provided. The cathode of the tube P is connected to ground and the control grid 90 is connected to a line 91 held at −100 volts, through a divider network 92 to maintain a sufficiently high bias. The grid 90 is also connected through a condenser 93 and a lead 94 to a cam operated contact CF52 (Fig. 2) which connects with a lead 95 coupled to a +55 volt supply. The anode of the tube P is connected to a lead 96 and through a pair of cam operated contacts CB13 and CB14 to a lead 97 connected through a set of contacts 98 operated by the RIA relay, to a lead 99 connected with each of the transfer cathodes T of the several A group storage tubes. As seen from the timing chart in Figure 6, the contacts CB13 and CB14 close ten times during each machine cycle and operate in conjunction with the CF52 contacts. It is to be noted that the CB13 and CB14 cam contacts are timed to span the duration of closing of the CF52 contacts, making it possible to condition the anode circuit before operating the control grid circuit and to hold the tube P in a conducting state until after the control grid pulses are terminated, insuring the best operating conditions for the tube. The conducting circuit for the tube P is traced from the +500 volt line 12 and resistor 11 to the anode 10 of each storage tube G, through the glow discharge to the transfer cathode T, a transfer cathode resistor 100 and the lead 99, contact 98, lead 97, the CB13 and CB14 contacts, lead 96 to the anode of the tube P and thence through the cathode to ground. This circuit is completed ten times for each card feed cycle with the reduced potential on the transfer cathodes T of each tube in group A causing the glow discharge to be transferred from the digit cathode to the transfer cathode and as the transfer cathode circuit is broken the glow advances to the next higher value digit cathode due to the construction of the storage tube as described heretofore. The result of this operation is an advancement of the glow position ten times for each card feed cycle or a complete circulation around each of the digit cathodes returning to the "0" cathode. The ability to store numeric data in the storage tubes is based entirely upon the principle of interrupting the normal advance of the glow discharge. Regardless of the interruption provided, the potential applied to the transfer cathodes T will be intermittently reduced in value and reestablished by the circuitry described. Interruption of the glow advance is accomplished through pulsing of the inversion cathodes I at a point in the cycle corresponding with the value of a digit read from the record card. By this means the glow is maintained at the I cathode until the remainder of the card is read whereupon the I cathode circuit is broken and the glow transfers to the digit cathode opposite the one from which it was removed by the inversion cathode and consequently the number stored in the tube is equivalent to the value of the hole sensed in the record card.

At approximately mid-index time relative to "9"–"8"–"7," etc., card time when the lower brushes LB sense successive rows of a record card passing 9 edge first through the second reading station, the glow discharge in the storage tubes is moved from the "0" to "1," "1" to "2," "2" to "3," etc., digit positions by the pulsing of the transfer cathode circuit 99. Considering, for example, the sensing of an "8" hole in column 1, the hub 70 for this column (Fig. 4) is energized at +55 volts at this time and the pulse is transmitted through a plug wire (not shown) to entry hub 71—1 (Fig. 2) through the normally closed contacts 102 of a read out relay ROA, the normally closed contacts 103 of a read out relay ROB, a lead 104, a capacitor 105 and resistor 106 to the control grid of the thyratron K–1, and through a capacitor 107 to a lead 108 and through a cam operated contact CF54 to ground. The control grid of the thyratron K–1, and through a resistor divider including a resistor 109 and a lead 110 to the lead 91 which is held at −100 volts. At the time the above read in circuit is completed to the grid, a pulse of sufficiently high positive value is applied, allowing the thyratron K–1 to conduct. The thyratron anode circuit is traced from the +500 volt line 12 through the voltage divider 15 (Fig. 1), a resistor 112, a lead 113, the normally open now closed contacts 75–1, the normally closed contacts 114 of the RIB relay to the anode of the thyratron K–1 and through the cathode circuit lead 108 and contacts CF54 to ground. Completion of this circuit causes the potential at the inversion cathodes of tube G1 in group A to be lowered, resulting in transfer of the glow to the adjacent I cathode. The I cathode is physically located between the "1" and "8" digit cathodes and, as the glow has advanced from the "0" to "1" digit cathode at mid-index time between "9" and "8" card time, it is transferred to this I cathode rather than to the "2" digit cathode, and held in this position until the contacts CF54 open at 203°. At this time the thyratron K–1 returns to a non-conductive state and, due to the self-complementary feature of the storage tube, the glow advances to the "8" digit cathode. Consequently, the reading of an 8 from the card resulted in a glow discharge in the true value position in the storage tube.

The read out operation is the next function to be described and the example used heretofore of an 8 stored in the group A tube G1 will be continued. One reading apparatus with which the storage system may be used in a punch device and the recording function is then the punching of a hole of equivalent digital value in a summary card. The controlling circuitry must, of a consequence, be operated by a group of cam switches or equivalent devices which are driven in synchronism with the card transporting medium in such a punching unit, while the accounting machine feed is latched and its CF cams inoperative. The cards in the recording unit may be fed 9 edge first or 12 edge first with provision made for complementing the stored data in the counter tube in order to punch the information in true value.

Referring now to Figure 9, the recording mechanism is diagrammatically illustrated as a punch device comprising eighty punch elements 120 and coacting punch dies 121, one for each card column, with only the first and last elements being shown in the figure for simplification. All like digits are punched simultaneously as the record card is fed 12 position first through the unit. The card is maintained at rest when punching occurs and moves intermittently between punching operations by a conventional Geneva type drive mechanism not shown. Each of the punch elements 120 pivotally carries an interponent 122 which is normally out of the path of motion of a continuously oscillating punch-depressor plate 123. The plate 123 or punch bail is operated through connecting rods 124 by eccentrics 125 mounted on a rotating shaft 126. The operating magnets 127, upon energization, act through an armature lever and link member 128 to hook the interponent 122 to the bail 123 during its downward stroke and accordingly, the selected punch elements 120 are driven through the card to produce a perforation.

With the cards fed 12 edge first, in the example of recording mechanism illustrated and described above, the "8" in the storage tube G1 must be inverted to complement form in order to punch a hole equivalent in decimal value to the true digit stored. Immediately at the start of the punch cycle, the P cams revolve and a set of cam operated contacts P8 (Fig. 5) close as shown in the timing chart of Figure 7. In this chart the timing of the recorder is shown in cycle points with one complete cycle occupying 14 points with the "12" to "9" points corresponding with the digit positions of the card under the punch elements 120. Closure of th contacts P8 completes a circuit from the line 40 to a storage read out control hub 130 which is connected by plug wires 131 and 132 to a set of transfer hubs 133 and 134, respectively. The transfer hubs are provided with selector contacts 135–2 and 136–2 operable by selector relays 135 and 136 to control the storage group from which the data is to be obtained. This selection, as before mentioned, is accomplished by the card feed unit from control punches in the card itself and before the punch device functions. A perforation in column 2 selects storage group A for read out while a perforation in column 4 selects storage group B for read out. Assuming the 8 placed in storage in group A is to be recorded now in the punch recording device, a perforation in column 2 at the 11 position will be sensed by the brush X2 at the lower reading station to provide +55 volts at a terminal 140 and through a plug wire 141, energizes a hub 142. During the second card reading cycle CF143 is closed at this time and the pick up coil of relay 144 is energized, closing its contact 144–1 and completing a circuit for the hold coil of relay 144 from the line 41 to line 36. Contacts 144–2 are also closed and complete a circuit for the pick up coil of the transfer relay 135 and the contacts 135–1 operated thereby energize the hold coil of this relay. Transfer contacts 135–2 are now completed and remain closed at the time the storage unit is read out. The hub 133 is now connected to hub 146 and through a plug wire 147 to a storage read out hub 148. The read out relay ROA for the A storage group is now energized through a circuit connected to the grounded lead 54. The relay ROA is held energized for most of the punch cycle and the common and normally open points of contacts 156 (Fig. 5) are held closed to read out the A group of storage tubes.

Figure 7:
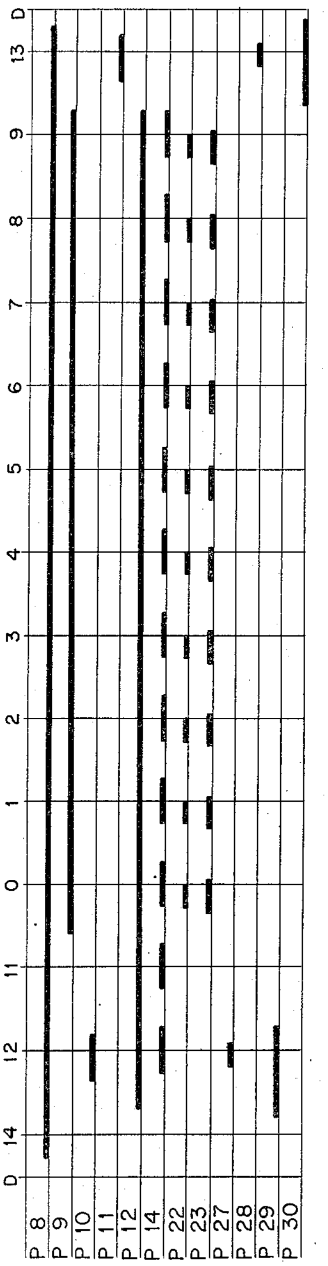
Figure 7 is a timing chart for the cam controlled circuit making devices of a recording apparatus such as a punch.

Upon closure of cam contacts P29, as shown in the timing chart of Figure 7, a circuit is completed from line 40 (Fig. 5) via lead 155, through the contacts P29, now closed contacts 156 operated by relay ROA and through the hold coil of the RIA relay by way of a lead 157 and to the grounded lead 54. This circuit maintains the common and normally open points of contacts 75–1, 75–2 . . . 75–N closed until the cam contacts P29 open. Cam contacts P10 close before P29 contacts open and complete a circuit to ground from the cathodes of the thyratrons K, and thereafter cam contacts P27 close applying a +55 volt potential to the grid of the tube K through a circuit including the line 95, contacts of P27, an inversion switch 160, lead 161, a condenser 162 and a resistor divider network 163. The thyratron K–1 is now rendered conductive through a path from the +500 volt line 12, the divider 15, lead 113, contacts 75–1, contacts 114 to the anode-cathode circuit and thence to ground through a contact P10.

In the example taken of an "8" stored in tube G1, completion of the inversion cathode circuit causes the glow discharge to be transferred from "8" digit cathode to the I cathode located between the "8" and "1" digit representing cathodes. The glow remains at this position until the cam contacts P10 open at which time the tubes K are rendered non-conductive and the glow, because of the self-complementing features of the tube G1, advances to cathode "1" where it remains until the transfer pulse control thyratron P initiates an advance. The "8" stored has now been inverted to a "1" and is now ready to be read out for the purpose of punching a hole in the summary card which is the true form of the digit stored. The inversion is accomplished in the storage tube to accommodate the direction of travel of the summary card through the punch unit which, as described, is 12 edge first or the reverse direction to that used by the card sensing unit of the accounting machine. By positioning the inversion switch 160 in the Off position, closure of the P27 and P10 contacts would be ineffective and the stored "8" would remain in the 8 digit position and, with the same recorder unit, a complement value would be punched, while with a punch operating to feed cards 9 edge first, a true value would be recorded.

Figure 2:
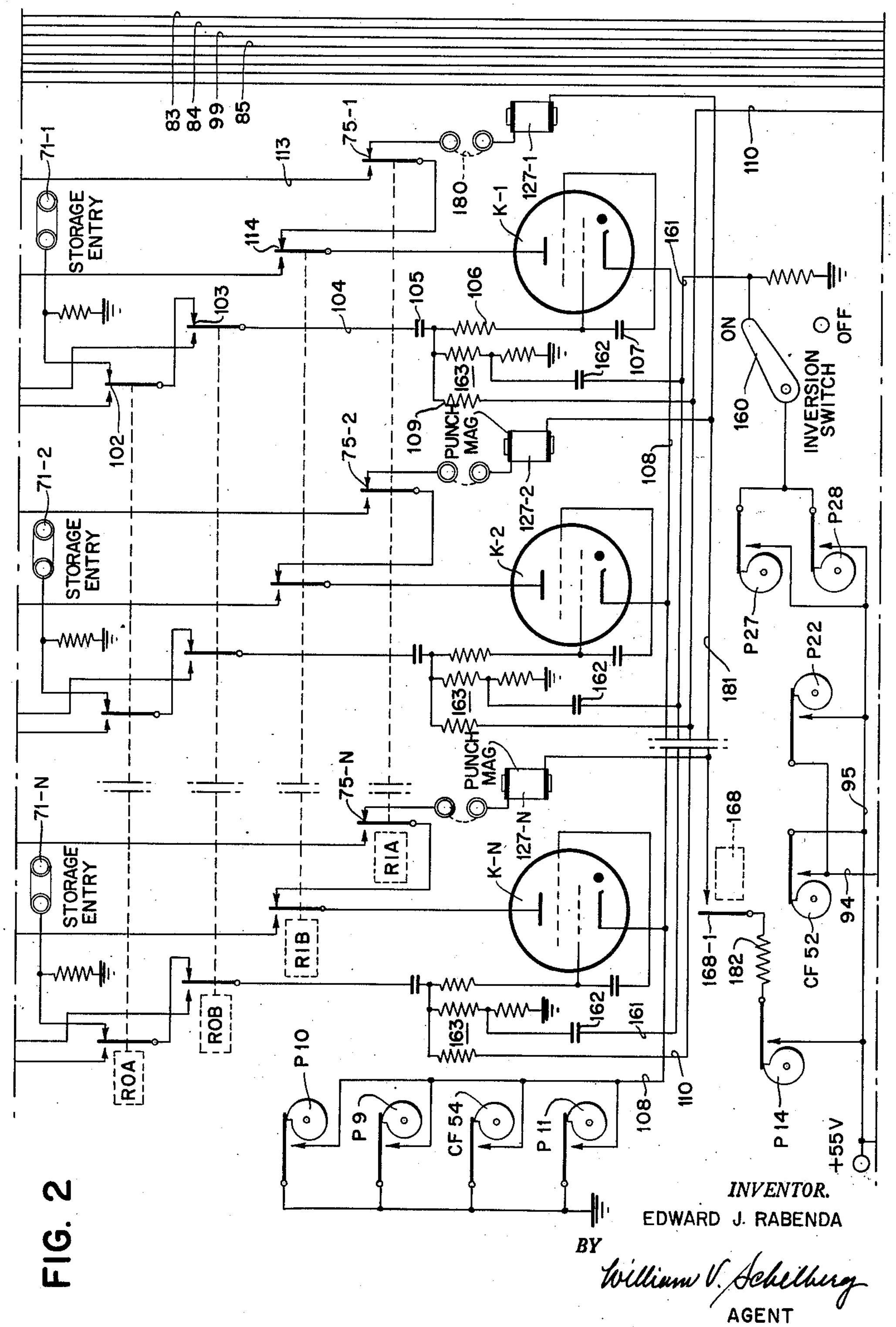

The punch magnet relay 168 (Fig. 5) is energized when the cam contacts P12 close (see Fig. 7) and remains closed for the duration of the actual punching cycle. The contacts 168–1 in Figure 2 are operated thereby and complete a circuit from the line 95 through a cam operated contact P14 which opens and closes for each punch position on a record card starting with "12" and ending with "9." The transfer cathodes T are operated by the control thyratron P in the same manner as for a read in function except that cam contact P22 (Fig. 2) control the grid circuit and cam contacts P23 (Fig. 3) control the anode circuit. Closing of these contacts is indicated in Fig. 7 and a circuit is completed through the ROA relay contacts 169 and the lead 99 to the transfer cathodes T. This circuit advances the glow repetitively in a manner similar to that described for the read in function, however, control is obtained by P cam contacts to synchronize the pulsing time with the 14 point cycle operation of the punch device. As soon as the transfer cathode circuit is opened at machine index point "0," the glow discharge standing at "1" advances to the 2 digit cathode. At index point "1" the glow advances to the 3 digit cathode and similarly, the glow continues to advance from the "9" digit cathode to the "0" digit cathode at "8" index time. As the glow arrives at the "0" digit cathode, its potential increases from +135 volts to +210 volts (approximately) and this 75 volt rise sends a positive pulse to the control grid of the thyratron K–1. This circuit path is traced from the "0" digit cathode of the storage tube G–1, a lead 170, the common and normally open contacts 102 of the ROA relay, the normally closed and common points 103 of the ROB relay, lead 104 and condenser 105 to the control grid of tube K–1. The positive pulse renders the thyratron K–1 conductive and a circuit path is effected through the anode, normally closed and common points 114 of the RIB relay, common and normally closed point 75–1 of the RIA relay, a plug wire 180, punch magnet 127–1 for the column position desired, a lead 181, contacts 168–1 of the punch relay magnet 168, a resistor 182, cam contacts P14 to the +55 volt line 95. The cathode circuit for tube K–1 is completed through the lead 108 and cam contact P9 which are closed during the "0" to "9" points of card travel.

An 8 hole has been punched in the card and the operation is complete insofar as the card is concerned, however, the normal function would be to reinvert the stored digits to true values so that they may be subsequently used in the accounting machine with the 9's being read out first. For this purpose a set of cam contacts designated P30 are provided as shown in Figure 5 and close at the conclusion of the punching operation to complete a circuit through the ROA relay through contacts 156 and lead 157. While the RIA relay points 75 are transferred, two other circuits are completed. First the P11 cam contacts close shortly before index point 13 to complete a circuit from the K tube cathode lead 108 to ground. The cam contact P28 also closes shortly before index point "13" to complete a circuit from the +55 volt line 95, the inversion switch 160, lead 161 and the divider 163 to the K tube control grid. This causes the thyratron K to conduct and complete a circuit through the inversion cathode circuit 113 relocating the glow standing at the "1" digit cathode to the inversion cathode between 1 and 8 positions. When the P11 cam contacts open the cathode circuit for the control thyratron K, and the tube is rendered and the tube is rendered non-conductive, the glow transfer from that I cathode to the "8" digit cathode. The contacts P30 now open allowing the RIA relay to deenergize and open the normally open contacts 75.

Should only a single card be punched, the CF51 contacts (Fig. 3) close at the beginning of a read in card feed cycle to reset the glow in the tubes G to a zero position as previously described, or the glow may be manually reset by depression of a key 190 to energize a reset relay 191 operative to control the set of contacts 77—80 of group A and a comparable group of contacts provided for group B.

Where it is desired to reproduce a number of cards in succession, each having the same data, it is the normal function of the system, as described, to reinvert the true figures to complements prior to each punching cycle and thereafter to reinvert the complement to true figures after each punching cycle. With relatively minor circuit changes the system may be made to invert only at the beginning of the first punching cycle and after the last punching cycle.

The storage system described is flexible in operation and can be arranged for any read in and read out combination to initiate the functions set forth in any desired sequence. Although only two groups of storage tubes are illustrated, any number may be used with only one control thyratron K needed for each denominational order and with the same tube controlling both the read in and read out operation. In addition, through use of the circuits substantially as shown, digits stored in one group of tubes may be transferred to another group of storage tubes also with only the one thyratron control tube being required. For example, if a digit stored in the units position of group A is to be relocated in group B, as the tube G1 in group A is read out, the glow in tube G1 of group B advances for read in and, upon a signal from the A group tube, the thyratron K–1 fires and locks the advancement in the group B tube.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a storage system of the character described, a plurality of glow transfer decade tubes each having an anode and ten cathodes between which a glow discharge may be sequentially positioned representative of decimal digits an electrode adjacent each said cathode, a source of differentially timed electrical impulses representative of a digit to be stored, means coupled to said glow transfer tubes for effecting a step by step advance of the glow discharge to successively higher digit representing cathode positions in timed relation with said electrical impulses, and means operable in response to said impulses to lock the glow at said adjacent electrode and render said latter means ineffective to advance the glow discharge to successive cathode positions after a selected interval.

2. An electronic decimal storage system comprising a group of denominationally ordered glow transfer storage tubes each provided with an anode, ten digit representing cathodes, a transfer cathode positioned between each digit cathode and an inversion cathode between digit cathodes representing complement values; a source of differentially timed digit representing impulses; means for initially establishing a glow discharge from a datum cathode to said anode; means coupled to said transfer cathodes for effecting a step by step advance of the glow discharge from one digit cathode to an adjacent digit cathode in timed relationship with said digit representing impulses; and means coupled with said inversion cathodes and operable in response to said impulses to lock the glow discharge at an adjacent inversion cathode so that further advance of said glow is prevented after a selected interval.

3. An electronic decimal storage system as set forth in claim 2 wherein said glow discharge is locked at an adjacent inversion cathode only until completion of the operation of said means coupled to said transfer cathodes and then transfers to a digit cathode representing the complement value of a digit representing impulse; and further means selectively operable for transferring said glow discharge to a digit cathode representing the true value of the digit.

4. An electronic decimal storage system comprising plural groups of glow transfer counter tubes each of which have ten stable glow discharge positions representative of decimal digits, sensing means for providing differentially timed electrical impulses representative of a value to be stored and an electrical signal indicative of one of said groups of counter tubes, means for effecting a step by step advance of the glow discharge from position to successively higher digit representing position in timed relation with said impulses and selectively operable on one of said groups of counter tubes in response to said electrical signal, and means operable in response to said impulses to render said latter means ineffective to advance the glow discharge after a differential time interval.

5. An electronic decimal storage system comprising at least one group of denominationally ordered glow transfer storage tubes each having an anode, ten digit representing cathodes, a transfer cathode positioned between each digit cathode, and an inversion cathode between true and complement value representing ones of said digit cathodes; a source of differentially timed digit representing electrical impulses; means for initially establishing a glow discharge in said storage tubes between said anode and a datum digit cathode; means coupled to said transfer cathodes for advancing the glow discharge from said datum cathode to an adjacent digit cathode and in step by step fashion to succeeding digit cathodes in timed relationship with said digit representing impulses; means comprising a thyratron tube coupled with said inversion cathodes and operable in response to said digit representing impulses to lock the glow discharge at an adjacent inversion cathode so that further advance of said glow is prevented whereupon the glow transfers to the associated digit cathode; means selectively operable to transfer said glow discharge to a complement value representing digit cathode; a recording device; means operable in synchronism with said recording device for reading out a stored digit and including said means coupled to said transfer cathodes for advancing said glow discharge; and circuit means connected to a predetermined one of said digit cathodes for differentially activating said thyratron tube and thereby operating said recording device.

6. An electronic decimal storage system comprising at least one group of denominationally ordered glow transfer storage tubes each having an anode, ten digit representing cathodes, a transfer cathode positioned between each adjacent digit cathode and inversion cathodes positioned between true and complement value representing ones of said digit cathodes; record card sensing means for producing differentially timed electrical impulses representative of information recorded in a record card; means coupled with said transfer cathodes for advancing an initially established glow discharge in sequence from one digit cathode to another in one direction in timed relation with said sensing means; means including an electron discharge device for each storage order connected with said inversion cathodes of the associated order storage tube for transferring a glow discharge therein from a digit cathode to an adjacent inversion cathode on activation of said device; and means connected with said sensing means and said discharge device for activating said discharge device in response to said differentially timed electrical impulses.

7. An electronic decimal storage system as set forth in claim 6 including recording means adapted to operate on a further record card fed therethrough; means operable in synchronism with said recording means for causing the information representing glow discharge established in said storage tubes to be advanced one complete cycle; and means connected to a particular one of said digit cathodes for indicating the differential time of passage of said discharge and thereby operate said recording means.

8. In an electronic storage system, a glow transfer storage tube comprising an anode, a plurality of digit representing cathodes, a transfer electrode arranged intermediate successive ones of said digit cathodes, inversion cathodes arranged between those digit cathodes of complement value; means for establishing a glow discharge representative of a digit value including pulse generator means connected with said transfer electrodes and adapted to sequentially advance an initially established glow discharge to digit cathodes of successive value; and means connected with said inversion cathodes for applying a differentially timed impulse thereto to restrain advance of the glow discharge at a time relative to a digital value.

9. An electronic digital storage system including at least one glow transfer storage tube comprising an anode, a plurality of digit representing cathodes, a transfer electrode arranged intermediate successive ones of said digit cathodes, inversion cathodes arranged between digit cathodes of complementary value; means for establishing a glow discharge between said anode and one of said digit cathodes; pulse generator means connected with said transfer electrodes and adapted to advance said glow discharge sequentially to a digit cathode of successive value; control means connected with said inversion cathodes for applying a differentially timed impulse thereto and to restrain further advance of said glow at a time relative to a digital value; means for selectively operating said control means during a time that said pulse generator means is inoperative to establish the glow discharge at a complement or true value digit cathode; means for operating said pulse generator means in timed relation with said differentially timed impulse; and further means for operating said pulse generator means to determine the digit stored in said glow transfer tube.

References Cited in the file of this patent

UNITED STATES PATENTS 2,407,320 Miller ---------------- Sept. 10, 1946